US012024937B2

(12) United States Patent
Reddmann

(10) Patent No.: US 12,024,937 B2
(45) Date of Patent: Jul. 2, 2024

(54) PARTIAL-OPENING DEVICE FOR A MOTOR-VEHICLE DOOR ELEMENT

(71) Applicant: Kiekert AG, Heiligenhaus (DE)

(72) Inventor: Uwe Reddmann, Essen (DE)

(73) Assignee: Kiekert AG, Heiligenhaus (DE)

(*) Notice: Subject to any disclaimer, the term of this patent is extended or adjusted under 35 U.S.C. 154(b) by 0 days.

(21) Appl. No.: 18/007,311

(22) PCT Filed: Jun. 24, 2021

(86) PCT No.: PCT/DE2021/100535
§ 371 (c)(1),
(2) Date: Jan. 30, 2023

(87) PCT Pub. No.: WO2022/042784
PCT Pub. Date: Mar. 3, 2022

(65) Prior Publication Data

US 2023/0272659 A1 Aug. 31, 2023

(30) Foreign Application Priority Data

Aug. 26, 2020 (DE) ..................... 10 2020 122 254.8

(51) Int. Cl.
*E05F 15/00* (2015.01)
*E05F 15/616* (2015.01)

(52) U.S. Cl.
CPC ....... *E05F 15/616* (2015.01); *E05Y 2201/426* (2013.01); *E05Y 2201/626* (2013.01); *E05Y 2900/531* (2013.01)

(58) Field of Classification Search
CPC ......... E05Y 2201/426; E05Y 2201/626; E05Y 2900/531; E05F 15/616
See application file for complete search history.

(56) References Cited

U.S. PATENT DOCUMENTS 7,244,213 B2 * 7/2007 Gueler .................. E05F 15/603 292/199
10,829,034 B2 * 11/2020 Mori ......................... B60Q 3/76
(Continued)

FOREIGN PATENT DOCUMENTS

DE 102015103830 A1 9/2016
DE 102016105760 A1 10/2017
(Continued)

OTHER PUBLICATIONS

International Search Report mailed Sep. 24, 2021, for priority International Patent Application No. PCT/DE2021/100535.

*Primary Examiner* — Daniel J Troy
*Assistant Examiner* — Daniel Alvarez
(74) *Attorney, Agent, or Firm* — Renner, Otto, Boisselle & Sklar, LLP

(57) ABSTRACT

A partial-opening device for a motor-vehicle door element, having an electric drive, an actuating element, more particularly a pushing element which acts the door element, wherein the actuating element can be moved by means of the electric drive and by means of a gearing arranged between the electric drive and the actuating element, such that the door element can be at least partially opened by means of the actuating element, and wherein the gearing has a drive lever, which is disposed on an outer end of the actuating element, which outer end is associated with the door element.

15 Claims, 2 Drawing Sheets

(56) References Cited

U.S. PATENT DOCUMENTS

| | | | | |
|---|---|---|---|---|
| 11,697,952 | B2 * | 7/2023 | Ottino | E05F 1/105<br>49/139 |
| 2021/0180380 | A1 * | 6/2021 | Lygin | E05F 15/63 |

FOREIGN PATENT DOCUMENTS

| | | | |
|---|---|---|---|
| DE | 102017124282 | A1 | 4/2019 |
| DE | 102018120553 | A1 | 2/2020 |

* cited by examiner

PARTIAL-OPENING DEVICE FOR A MOTOR-VEHICLE DOOR ELEMENT

This application is a national phase of International Patent Application No. PCT/DE2021/100535 filed Jun. 24, 2021, which claims priority to German Patent Application No. 10 2020 122 254.8 filed Aug. 26, 2020, each of which is hereby incorporated herein by reference in its entirety.

FIELD OF DISCLOSURE

The invention relates to a partial-opening device for a motor vehicle door element, having an electric drive, an actuating element, in particular a pushing element which acts on the door element, wherein the actuating element can be moved by means of the electric drive and by means of a gearing arranged between the electric drive and the actuating element, such that the door element can be at least partially opened by means of the actuating element.

BACKGROUND OF DISCLOSURE

One of the efforts of car manufacturers is to increase comfort when getting into the motor vehicle. This can be achieved, for example, by providing vehicles that do not have an external door handle or that do have an external door handle, but it only generates a switching signal that opens and positions the door element. In the case of a vehicle without outside door handles, the operator can, for example, open the vehicle using a sensor located on the vehicle or by means of a radio remote control. In order to allow the door element to be gripped and fully opened in the above-mentioned cases, so-called partial-opening devices or door check arms or door dividers are used.

DE 10 2016 105 760 A1 discloses a partial-opening device for a motor vehicle door with a base plate, furthermore with a drive element mounted on the base plate and a drive unit, wherein a first sensor assigned to the drive element is provided and distinguishes at least between a partial-opening process and a manual opening process. The partial-opening device comprises a drive which can be driven via a sensor and a control unit. A flexible connecting means then makes it possible to pivot a transmission lever which in turn allows a partially opening movement via a drive lever and a drive slide. To enable the door to be moved or opened, the drive slide moves linearly and, for example, out of an opening in a car body, such that an unlocked and unlocked door can be opened at least within a range. The end position of the drive slide can be detected by means of a stationary sensor such that the drive can be switched off when the door element is in the open position.

Another partial-opening device for a motor vehicle door has been disclosed in DE 10 2017 124 282 A1. The partial-opening device has an electric drive and an actuating means, wherein the actuating means can be moved by means of the drive, and wherein the motor vehicle door can be partially opened by means of the actuating means, and comprises at least one sensor for detecting the actuating movement. For continuous detection of an actuating movement of the door element, the partial-opening device also has a sensor that is directly integrated into the actuating means. The actuating means is provided with a pushing element, wherein the pushing element is in engagement with the moving door element and works together with a switching means as long as the actuating means exerts a force on the door element. As long as the actuating means moves the door element, the actuating movement can be sensed and detected by the sensor. If the door element is, for example, gripped by the operator, the sensor signal stops such that the actuating means can be moved back to its initial position, for example.

Another partial-opening device with sensory detection of a position of the door element has been disclosed in DE 10 2015 103 830 A1. By means of an actuator arranged on the door retaining strap, the retaining strap can be moved and the door can be partially opened. For this purpose, an actuator acts on a drive disk movably arranged in the door element, which in turn works together with a stop and can therefore position the door element. If the door element has been partially opened in the open position, such open position is detected by means of a switching means of a sensor, in particular a switching means. An additional second actuator enables the door to be fully opened beyond the open position.

The partial-opening devices for a motor-vehicle door element known from the prior art have proven themselves in principle, but reach their limits when a compact and, in particular, lightweight design is required. In particular if, for example, the positioning device is to be installed in a motor vehicle lock or in the region of the motor vehicle lock in a side door, a light, non-compact design is advantageous, since the space requirement is always limited. In addition to the requirements of a lightweight construction and compactness, a partial-opening device must be able to master all functionalities and in particular extreme situations. This is where the invention comes in.

SUMMARY OF DISCLOSURE

The object of the invention is to provide an improved partial-opening device. In particular, it is an object of the invention to provide a compact and lightweight design of the partial-opening device.

The object is achieved by the features of the independent claim 1. Advantageous forms of the invention are indicated in the subclaims. It should be noted that the exemplary embodiments described below are not restrictive; rather, any options for variation of the features described in the description and the dependent claims and the drawings are possible.

The object of the invention is achieved by providing a partial-opening device for a motor-vehicle door element, having an electric drive, an actuating element, more particularly a pushing element which acts on the door element, wherein the actuating element can be moved by means of the electric drive and by means of a gearing arranged between the electric drive and the actuating element such that the door element can be at least partially opened by means of the actuating element, wherein the gearing has a drive lever, and the drive lever is arranged on an outer end of the actuating element associated with the door element. The design of the partial-opening device according to the invention now makes it possible to adapt the actuating element very precisely to the posed requirements. In particular, the actuating element can be designed to be light overall, since the transition, i.e. the flow of force from the drive lever to the actuating element, takes place in a region that is arranged directly where the force for partially opening the door element is introduced for partially opening it. In other words, the drive lever is arranged so far at the outer end of the actuating element that the actuating element performs the partially opening movement, but the force transmission is introduced directly into the outer end of the actuating element via the drive lever. The force flow is therefore transmitted via the drive lever to the actuating element and to the door element or car body, wherein the force flow through the actuating element is minimized. Relieved overall by minimizing the force flow through the actuating element and can be adapted and configured very precisely to the requirements, i.e. the forces needed.

The drive lever can also be regarded as the first lever of a lever gear, wherein this first lever is arranged directly on the actuating element.

The partial-opening device relates to motor-vehicle door elements, but can also be used for tailgates, flaps, covers or hoods within the scope of the invention. In other words, wherever movably arranged components in motor vehicles are held in a closed position and are moved to a partially opened position for opening. The partially opened position then allows the operator to reach into a gap created by the partial-opening device, such that manual opening is possible.

The electric drive unit thereby enables the movement of the actuating means. The electric drive unit comprises an electric motor, preferably a DC motor, which acts on the actuating means with at least one gear stage. By means of the electric motor, it is then possible to move the actuating means in such a way that the door element can be partially opened by the driven actuating means. Thereby, the actuating means moves relative to the car body and exerts a compressive force on the motor vehicle door element such that the unlatched and unlocked door can be moved.

According to the invention, a motor vehicle locking system works together with the partial-opening device, wherein the motor vehicle locking system has a rotary latch and at least one pawl. The locking mechanism formed by the rotary latch and the pawl can be unlocked electrically. In particular in the case of electrically unlockable closing systems, the operator of the motor vehicle only needs an electrical pulse to move the closing system into an unlocked, i.e., open, position. The closing system is open after unlocking so that the door or flap can be moved. The electrical opening pulse for the closing system can be generated by means of a sensor, a key or by means of a sensing means such as a touch sensor or a door handle with an integrated sensor.

Once the vehicle door element is unlocked, the door element can be freely pivoted in the hinges. The door may also have a door limiter which can hold the door in a plurality of open positions. Once the door has been unlocked, it can be moved by means of the partial-opening device, wherein the different positions of the door element enable the functional positions of the actuating means to be detected by means of the arrangement of the sensors or switching means according to the invention.

In one preferred design variant of the invention, the drive lever can be pivotably fastened to the actuating element. The pivoting mounting of the drive lever on the actuating element makes it possible to achieve favorable engagement conditions from an actuating lever actuating the drive lever. In particular, the drive lever can be oriented to changed engagement conditions and therefore be modified to be a cost-effective lever gear. Preferably, the drive lever is driven by another actuating lever, wherein the pivoting mounting of the drive lever allows the first and second levers, or the drive lever and the actuating lever, to roll on each other.

If the actuating element has at least a guiding region and a partially opening region, a further advantageous design variant of the invention can be provided. By connecting the drive lever to an outer end of the actuating element, it is possible to divide the actuating element into different regions in which different requirements are placed on the actuating element. On the one hand, there is a partially opening region on the actuating element, wherein the partially opening region is the region on which the drive lever is arranged. Here, as described above, the transmission of force for partially opening the door element takes place. In this region, high forces may be required to partially open the door element in extreme situations. In particular whenever an extreme situation makes the door element difficult to move, high forces must be transmitted. High demands must therefore be placed on the partially opening region in terms of a structural design.

In contrast, a stable design can be dispensed with in the guiding region of the actuating element since only stabilization and guidance of the actuating element must be ensured in the guiding region. The force is transmitted from a gearing via the drive lever to the partially opening region. The guiding region, which can preferably start behind the bearing point of the drive lever, is used only for alignment and guidance of the actuating element. Consequently, lower stability requirements are placed on the guiding region of the actuating element. The regions on the actuating element therefore differ in terms of tasks and can be adapted to the requirements or tasks according to the invention. In particular, it is possible to constructively adapt the different regions to the requirements, wherein a one-piece as well as multi-part design of the actuating element is possible. For example, the guiding region can be structurally slim and optimally adapted to guide properties with guide grooves or ribs, whereas the partially opening region can have a structurally stable design. The different regions can therefore be individually adapted to the posed requirements.

It has proved advantageous if at least the partially opening region is formed from a metallic material, at least partially. The partially opening region of the actuating element is used to transmit force from the electric drive via the gearing to the structural element to be partially opened. The structural element to be partially opened can be a door or panel, as described above. The partial-opening device can itself be arranged in the movable structural element or can be firmly held in the car body of the motor vehicle. In any event, the partial-opening device initiates a relative movement between the door element and the car body. Strong forces may be required for partial opening if extreme situations arise. An extreme situation can exist, for example, if a person is leaning against the door to be opened. In this case, increased forces are required to partially open the door element. However, an extreme situation can also exist if, for example, an iced-up door seal prevents the door element from moving due to environmental influences. In this case, high forces up to 500 N must be transmitted via the actuating element and, according to the invention, through the partially opening region. It is therefore advantageous if a metallic material is present at least in the partially opening region as a bearing for the drive lever and/or for transmitting force in the actuating element. This also allows strong forces to be transmitted consistently over time, ensuring reliable partial opening over the entire life of the motor vehicle. The metallic material can be a steel material, for example, or for example an aluminum material characterized by its low weight. The partially opening region can be formed entirely of a metallic material. A damping means can be arranged in the region of the contact surface to the door element or to the car body. However, it is also conceivable to design the partially opening region as a hybrid component such that, for example, a metallic core with a plastic coating is present. The bearing point for the drive lever can be formed from the metallic coating, the metallic core, or both.

If the actuating element is made of plastic, at least in regions, a further advantageous design variant of the invention results. Forming the actuating element from plastic and, in particular, forming at least some regions of the guiding region from plastic results in a number of advantages for the partial-opening device. By using plastic, a very lightweight actuating element can be provided. In addition, it is possible to form complex shapes such as guide ribs on the actuating element which can improve the properties of the actuating element. In addition, it is also possible to use plastics with lubricating properties such that, for example, safe and low-maintenance guidance of the actuating element is possible in the guiding region. It is also conceivable in this case that the actuating element is formed from two or more parts, wherein, for example, the partially opening region has a metallic core with a plastic coating, whereas the guiding region is made exclusively of plastic. The connection between the partially opening region and the guiding region can be a form-fit, and/or force-fit, and/or bonded connection. Given the use of plastic and, in particular, forming the actuating element as a hybrid component in a single-part or multi-part embodiment, the weight of the actuating element can be reduced to a minimum. A lightweight partial-opening device can therefore be provided which can also provide all loads and functionalities due to the high degree of design freedom in the region of the plastic.

In addition to the design advantages and the advantage of the low weight of the plastic, plastics make it possible to manufacture the actuating element economically. The advantages of light weight, design freedom and light weight are therefore mutually beneficial with regard to the partial-opening device according to the invention.

If, when the door element is in an open position, a bearing point of the drive lever protrudes at least partially, preferably completely, from an opening of a seat for the partial-opening device, this yields a further embodiment according to the invention. The bearing point for the drive lever is arranged on an outer end and in the partially opening region of the actuating element. The bearing point can be arranged so far in the direction of the end of the actuating element that, when the door element is in the open position, the drive lever protrudes from the opening for the actuating element. The bearing point as well as the drive lever can be therefore visible in the region of the actuating element or the opening. The partial-opening device is preferably arranged in the motor vehicle door or the car body in such a way that the actuating element, when in a non-actuated state, is flush with the opening in the car body i.e. an initial position. The initial position can also be the one in which the actuating element already protrudes beyond the opening and rests against the door element or the car body. Contacting can shorten actuating times and minimize noise.

It can also be advantageous and represent a design variant of the invention when the partial-opening device works together with an electrically unlockable motor vehicle lock at least by means of a control unit. During routine actuation of the partial-opening device, the motor vehicle lock is electrically unlocked in a first method step, wherein a pawl of a locking mechanism is moved out of the engagement region with a rotary latch. The rotary latch becomes free and releases a lock holder so that the door element can move freely. After the vehicle lock has been unlocked, a signal is transmitted to the drive of the partial-opening device, and the actuating element is operated. The door element is then moved from a closed position into an open position, resulting in a door gap into which an operator can reach and fully open the door element. Advantageously, the operator can therefore give the signal to open or partially open the door element in an open position by means of a radio remote control, for example. The motor vehicle lock is thereby unlocked and the door element is partially opened enough so that the operator can only grasp the door element and open it partially or completely.

The design of the partial-opening device according to the invention with the arrangement of the drive lever in a front third of the actuating element enables a well constructed, but also at the same time lightweight design of the partial-opening device. This allows all functionalities and requirements for the partial-opening device to be realized, such that a lightweight design can be combined with compactness and a cost-effective design.

BRIEF DESCRIPTION OF DRAWINGS

In the following, the invention is explained in more detail with reference to the appended drawings using an exemplary embodiment. However, the principle applies that the exemplary embodiment does not limit the invention, but is merely an advantageous embodiment. The features shown can be implemented individually or in combination with further features of the description as well as the claims—individually or in combination.

In the drawings.

DETAILED DESCRIPTION

Figure 1:
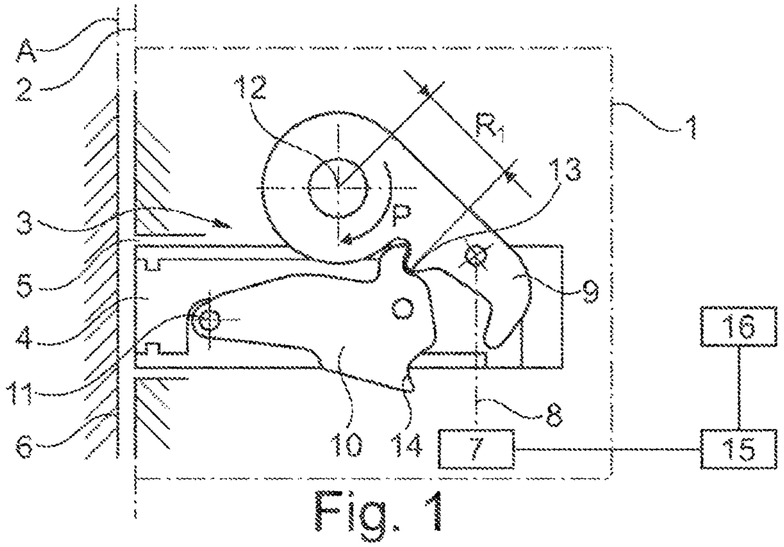
FIG. 1 shows a schematic illustration of an embodiment in a side view, wherein only the components essential for explaining the invention are shown, and wherein the initial position of the partial-opening device is shown.

FIG. 1 shows a schematic illustration of a partial-opening device 1 installed in a car body 2 of a motor vehicle in a side view of the gearing 3 and the actuating element 4. The partial-opening device 1 is shown in its initial position, wherein the actuating element 4 is flush with an opening 5 in the car body 2. A motor-vehicle door element 6 is in a closed position in which the door element 6 is, for example, held in the main latching position by an electrically actuated closing system. The partial-opening device 1 also has an electric drive 7, which, for example, engages with the gearing 3 via a Bowden cable 8. In turn, the gearing 3 in this exemplary embodiment is formed by two levers 9, 10, wherein a first lever 10 is pivotally accommodated in the actuating element 4, and a second lever 9 is pivotally accommodated in the partial-opening device 1. In the partial-opening device 1, the first lever 10 is pivotably fastened about a pivot axis 11, and the second lever 9 is pivotably fastened the pivot axis 12.

Two engagement regions 13, 14 are formed between the first and second levers 9, 10, each with a corresponding effective radius R1, R2 in the gearing 3.

FIG. 1 shows the initial position A of the door element 6 in which the door element 6 is in the closed position. The actuating element 4 is held, for example, spring-loaded in the initial position, i.e. flush with the opening 5 in the partial-opening device 1. If a control signal is now transmitted to the control unit 15 by the operator, a control signal is first sent to an electric lock 16, wherein the electric lock is unlocked. The control unit 15 then initiates the partial-opening process. For this purpose, the control unit 15 actuates the electric drive, whereby the second lever 9 is moved in the direction of the arrow P, for example, with the aid of the Bowden cable 8. As shown in FIG. 1, the second lever 9 rests against the first lever 10 in the engagement region 13 and rolls in the engagement region 13 with the effective radius R1.

Figure 2:
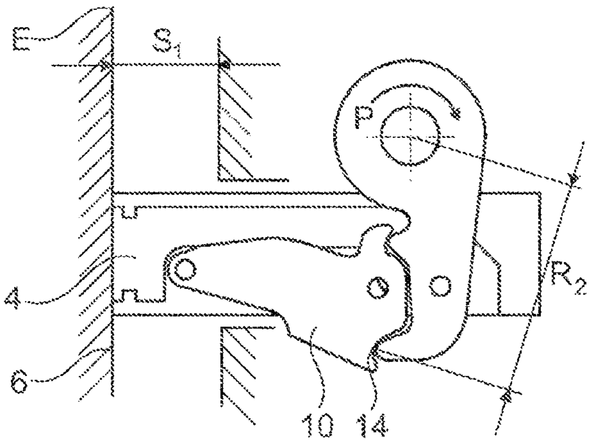
FIG. 2 shows the partial-opening device in a position in which the first effective radius has enabled ice breaking, and a partially opened door element is shown.

The transmission ratio means that a large force is exerted on the actuating element 4 such that the actuating element 4 can also break up ice, i.e. an iced door seal. If the door element 6 has been partially opened enough for a release from the door seal to have been definitely achieved, the door element 6 is then in the ice-breaking position shown in FIG. 2. The door element 6 is already open across a gap S1. When the ice-breaking position E is reached, the second effective radius R2 then engages the first lever 10 in the engagement region 14, wherein a larger effective radius R2 comes into engagement with the first lever 10. The transmission ratio changes in such a way that partial opening can take place at an increased speed.

Figure 3:
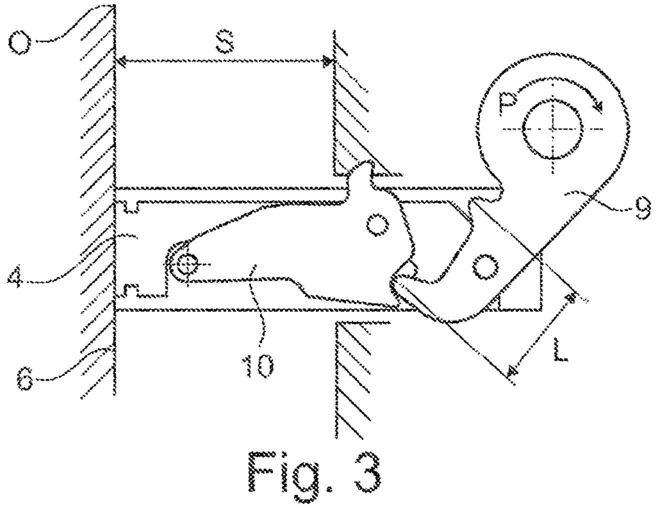
FIG. 3 shows the partial-opening device in a position in which the door element has been moved to its open position, and the second effective radius acts on the actuating element and holds the door element in the open position.

After a further actuation of the second lever 9, the open position O of the door element 6 shown in FIG. 3 is reached. As can be clearly seen in FIG. 3, the larger effective radius R2 now acts on the first lever 10, allowing the door element 6 to be partially opened quickly. given the spacing L of the engagement regions 13, 14, a discontinuous transmission ratio can be realized in the partial-opening device. A continuous partial opening with different functionalities can therefore be realized with the simplest design means. The spacing L of the engagement regions 13, 14 can be selected in such a way that, depending on the available or required force input, an optimized force curve can be realized in the partial-opening device 1. It has proven advantageous in this regard if the ratio of the effective radii to one another is R1:R2=1:2. After the door element has been partially opened, the partial-opening device 1 can move the actuating element 4 back to the initial position, for example, by means of a spring element. However, it is also conceivable that the actuating element 4 is moved back to the initial position when the door element 6 is closed by means of the door element 6 itself.

Figure 4:
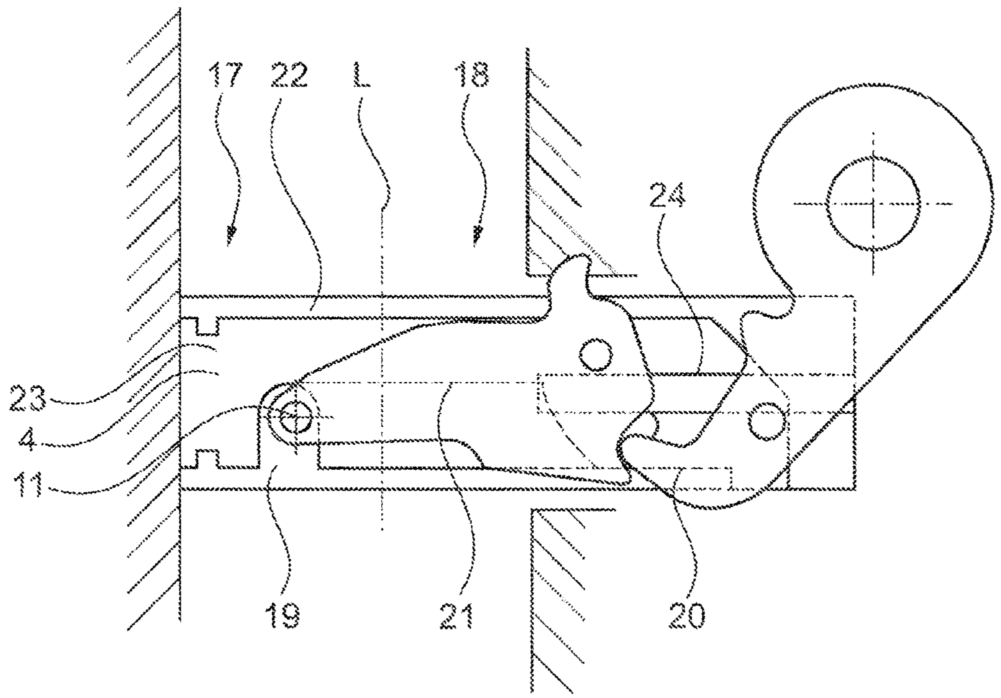
FIG. 4 shows an enlarged view of the schematic illustration of the partial-opening device according to FIG. 3 in an open position of the door element.

FIG. 4 shows the open position according to FIG. 3. FIG. 4 also shows the division of the actuating element 4 into an partially opening region 17 and a guiding region 18. In this case, the dotted line L shows the approximate division of the actuating element 4 into one-third of a partially opening region 17 and two-thirds of a guiding region 18.

FIG. 4 shows various embodiments of actuating elements 4 as hybrid components. Preferably, a metal core 19 is arranged in the region of the pivot axis 11, which extends at least into the region of the pivot axis 11. Depending on the embodiment and the requirements for the stability of the actuating element 4, there can also be an extension 20 of the metal core 19 into the guiding region 18.

In addition, it is also conceivable that, in order to increase stability, the metal core 19 extends far into the guiding region 18, which is indicated by the dashed line 21 as an example. Furthermore, it is also conceivable that several metal cores 19, 22 are arranged in the actuating element 4 in order to therefore serve to further stabilize the actuating element. In addition to the metal core 19, 22, the actuating element can have a plastic region 23 that connects and/or stabilizes the metal cores 19, 22.

The illustrated embodiments of the metal core 19, 22, the extension 20, the dashed line 21 and the plastic region 23 are only examples, and the division can be adapted to the requirements of the actuating element 4. In particular, depending on the open position, speed and gap dimension, different requirements can be placed on the actuating element 4, such that a structurally adapted embodiment is necessary. In particular, a guide rib 24, for example, can be arranged in the guiding region 18 and is, for example, formed from a plastic coating 23 of the metal core 19, 22. It is also possible to form a multi-part design of the actuating element, for example in the region of the dashed line L, such that the partially opening region 17 is structurally very strong, and the guiding region 18 is light and can be formed merely as a guide element. A lightweight partial-opening device 1 can therefore be provided that masters all the loads and functionalities of the partial-opening device 1.

LIST OF REFERENCE SIGNS

1 Partial-opening device
2 Car body
3 Gearing
4 Actuating element
5 Opening
6 Motor-vehicle door element
7 Electric drive
8 Bowden cable
9, 10 Lever
11, 12 Pivot axis
13, 14 Engagement region
15 Control unit
16 Electric lock
17 Partially opening region
18 Guiding region
19, 22 Metal core
20 Extension
21 Dashed line
23 Plastic region
24 Guide rib
R, R1 Effective radius
A Initial position
E Ice-breaking position
O Open position
P Arrow
S1, S Gap
L Dot-dashed line

The invention claimed is:

1. A partial-opening device for a motor-vehicle door element, the partial-opening device comprising:

an electric drive, an actuating element comprising a pushing element which acts on the door element, and a gearing arranged between the electric drive and the actuating element, wherein the actuating element is moved by the electric drive and by the gearing such that the door element is at least partially opened by the actuating element, and wherein the gearing has a drive lever, and the drive lever is arranged on an outer end of the actuating element that is adjacent to the door element, wherein the gearing further includes an actuating lever that drives the drive lever, and wherein in a closed position of the door element the actuating lever engages with the drive lever at a first engagement region, in a partially-open position of the door element the actuating lever engages with the drive lever at both the first engagement region and at a second engagement region, and in an open position of the door element the actuating lever engages with the drive lever at the second engagement region.

2. The partial-opening device according to claim 1, wherein the drive lever is pivotably fastened to the actuating element.

3. The partial-opening device according to claim 1, wherein the actuating element has at least one guiding region and one partially opening region.

4. The partial-opening device according to claim 3, wherein the drive lever is fastened to the actuating element in the partially opening region of the actuating element.

5. The partial-opening device according to claim 3, wherein at least the partially opening region is formed at least partially from a metallic material.

6. The partial-opening device according to claim 3, wherein the guiding region comprises two thirds of the actuating element and the partially opening region comprises one third of the actuating element.

7. The partial-opening device according to claim 1, wherein the actuating element is formed at least partially from plastic.

8. The partial-opening device according to claim 1, further comprising an adjusting lever, wherein the drive lever is actuated by the adjusting lever.

9. The partial-opening device according to claim 1, wherein when the door element is in an open position, a bearing point of the drive lever protrudes at least partially from an opening of a car body for the partial-opening device.

10. The partial-opening device according to claim 1, wherein the actuating element is constructed in at least two parts.

11. The partial-opening device according to claim 1, wherein when the door element is in an open position, a bearing point of the drive lever protrudes completely from an opening of a car body for the partial-opening device.

12. The partial-opening device according to claim 1, wherein a ratio of a first radius of rotation of the actuating lever to a second radius of rotation of the drive lever is 1:2.

13. The partial-opening device according to claim 1, wherein the electric drive engages with the gearing via a Bowden cable.

14. A motor-vehicle door element comprising:

the partial-opening device according to claim 1, an electrically unlockable lock, and a control unit that operates the partial-opening device to open the electrically unlockable lock.

15. The motor-vehicle door element according to claim 14, wherein when the door element is in an open position, a bearing point of the drive lever protrudes completely from an opening of the door element for the partial-opening device.

* * * * *